US007643036B1

(12) United States Patent
Rees (10) Patent No.: US 7,643,036 B1
(45) Date of Patent: Jan. 5, 2010

(54) REPRESENTING COLOR GAMUTS IN COLOR CHARTS

(75) Inventor: Clive M. Rees, Cambridge (GB)

(73) Assignee: Adobe Systems Incorporated, San Jose, CA (US)

( * ) Notice: Subject to any disclaimer, the term of this patent is extended or adjusted under 35 U.S.C. 154(b) by 273 days.

(21) Appl. No.: 10/327,744

(22) Filed: Dec. 23, 2002

(51) Int. Cl.
*G09G 5/02* (2006.01)
(52) U.S. Cl. .................. 345/594; 345/589; 345/590; 345/591; 345/593; 345/595; 345/597; 715/810
(58) Field of Classification Search ................ 345/590, 345/591, 593–595, 597, 589, 601; 715/763, 715/810; 382/165
See application file for complete search history.

(56) References Cited

U.S. PATENT DOCUMENTS

| 5,254,977 | A | * | 10/1993 | MacDonald | 345/591 |
| 5,416,890 | A | * | 5/1995 | Beretta | 345/590 |
| 5,731,818 | A | * | 3/1998 | Wan et al. | 345/590 |
| 5,903,255 | A | * | 5/1999 | Busch et al. | 345/594 |
| 6,226,010 | B1 | * | 5/2001 | Long | 345/594 |
| 6,411,304 | B1 | * | 6/2002 | Semba et al. | 345/590 |
| 6,560,356 | B1 | * | 5/2003 | Takahashi et al. | 382/162 |
| 6,697,079 | B2 | * | 2/2004 | Rose | 345/593 |
| 6,778,185 | B1 | * | 8/2004 | Moroney | 345/590 |
| 7,180,524 | B1 | * | 2/2007 | Axelrod | 345/593 |
| 2004/0001072 | A1 | * | 1/2004 | Newman | 345/593 |
| 2004/0046802 | A1 | * | 3/2004 | Wright et al. | 345/810 |

OTHER PUBLICATIONS

Screenshots #1-9 of Microsoft PhotoDraw 2000. Microsoft Corp (c) 1995-1999. Screenshots created Nov. 1, 2004.*

* cited by examiner

*Primary Examiner*—Antonio A Caschera
(74) *Attorney, Agent, or Firm*—Fish & Richardson P.C.

(57) ABSTRACT

Methods and apparatus, including computer program products, for presenting color samples in a color chart. The color chart includes an arrangement of multiple color samples that include colored areas representing colors in a color space. Color samples in the arrangement are associated with one or more color identifiers that uniquely identify the colors represented by the corresponding color samples. A gamut identifier identifies a color gamut relative to the colors represented by the color samples in the arrangement. A gamut mapping is provided to map a color from outside the color gamut to a color inside the color gamut.

47 Claims, 3 Drawing Sheets

REPRESENTING COLOR GAMUTS IN COLOR CHARTS

BACKGROUND OF THE INVENTION

The present invention relates to printing and displaying colors.

Typical printing and display devices can reproduce only a limited set of colors. The range of colors that can be faithfully reproduced by a particular display device or by a particular printing device on a particular printing medium is called a color gamut: the larger the gamut, the more colors can be reproduced. For example, glossy paper has a larger gamut than plain paper, because there are bright colors that can be printed on the glossy paper but not on the plain paper. Also, computer displays have typically larger color gamut than simple printers. To represent colors that are outside of the color gamut, a color device can use gamut mappings that map colors from outside to colors inside the gamut.

Designers use color charts to select colors for designing materials. Color charts can be device dependent or device independent. Device dependent charts present color samples that can be reproduced by a device on a medium. Examples of such color charts include Cyan-Magenta-Yellow-Black ("CMYK") charts that are typically used in the printed press and include color samples with different percentages of Cyan, Magenta, Yellow, and Black inks. Alternatively, device dependent charts can use other color conventions, such as Red-Green-Blue ("RGB") colors for designing material displayed on computer screens. A device dependent chart allows a designer to visually compare different colors as they will appear on the medium.

Device independent charts, for example, solid spot color charts, are typically used for cross-media publication, i.e., when a design is displayed or printed on multiple media or by different devices. Solid spot charts include a limited set of color samples mixed from high quality special inks of different colors to cover a large color gamut. For example, solid spot charts contain colors that cannot be printed with CMYK inks, so designers use cross reference charts to find the nearest CMYK color for each solid spot color.

SUMMARY OF THE INVENTION

Color charts according to the invention present color samples in a user friendly way and indicate which color samples in the chart are inside or outside of a color gamut. In general, in one aspect, the invention provides methods and apparatus, including computer program products that implement techniques for presenting color samples in a color chart. The color chart includes an arrangement of multiple color samples that include colored areas representing colors in a color space. Color samples in the arrangement are associated with one or more color identifiers. The color identifiers uniquely identify the colors represented by the corresponding color samples. A gamut identifier identifies a color gamut relative to the colors represented by the color samples in the arrangement.

Particular implementations can include one or more of the following features. The arrangement can be ordered according to one or more parameters of the color space. The gamut identifier can identify a color gamut of a printing device on a medium. The color identifiers can include hue or saturation values, or both, for the colors represented by the associated color samples. The gamut identifier can include a line representing saturation values as a function of hue values. The color identifiers can include darkness values for the colors represented by the associated color samples. The hue, saturation and darkness values can be each defined in the continuous range from 0 to 100.

Each color sample can occupy a location in the arrangement adjacent to one or more color samples representing colors that have hue values substantially equal to the hue value of the color represented by the color sample. The adjacent color samples representing colors that have substantially equal hue values can form a sequence along which saturation values of represented colors vary monotonously from sample to sample.

The color space can be related to a device-independent color space. The device-independent color space can be L*a*b* color space. The arrangement can define a two-dimensional array of color samples that represent colors sharing a common darkness value. The array can be a rectangular array. The arrangement can include a plurality of two-dimensional arrays. Each array can include only color samples that represent colors sharing a darkness value. The shared darkness value can be different from the darkness value of colors represented by the color samples in every other array in the arrangement.

In general, in another aspect the invention provides methods and apparatus, including computer program products, that implement techniques for representing colors in a color space. The techniques include arranging multiple color samples in a color chart. The color samples include colored areas representing colors in the color space. One or more color identifiers are associated with color samples in the color chart. The color identifiers uniquely identify the colors represented by the corresponding color samples. A color gamut is represented relative to the colors of the samples in the color chart.

Particular implementations can include one or more of the following features. A color gamut of a printing device on a medium can be represented relative to the colors of the samples in the color chart. A first color from outside the color gamut can be mapped to a second color inside the color gamut. Mapping the first color can include mapping the first color that has a first saturation value to a second color that has a second saturation value that is smaller than the first saturation value. Mapping a first color can include mapping the first color that has first a darkness value to a second color that has a second darkness value that is smaller than the first darkness value. The first color can be mapped to the second color such that a hue value of the first color is substantially equal to a hue value of the second color. The first color can be mapped to the second color such that a darkness value of the first color is substantially equal to a darkness value of the second color. An outer region of the color gamut can be defined, and the second color can be inside the outer region of the color gamut.

The invention can be implemented to realize one or more of the following advantages. Incorporating gamut identifiers into color charts gives designers a convenient way to see which colors can be faithfully reproduced by a device, and which colors will be adjusted by gamut mapping. If the gamut mapping rules are known, the designer can visually estimate what colors will look like after the mapping. By indicating different color gamuts in the chart, the same color chart can be used to select colors for reproduction by multiple devices or on different media. The colors of the samples can have an intuitive, user friendly reference system that uses color identifiers such as hue, darkness, and saturation. The reference system can be related to device independent colors, so there is no need to use a cross reference chart, e.g., to match colors on different devices, or to find relations between CMYK and solid spot colors. The device independent colors can be scientifically defined colors, such as L*a*b* colors.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

A color chart is a visual representation of a color space, in which color samples are arranged to represent the distribution of colors in the color space. The color samples are arranged on the color chart so that each color sample can be individually addressed, for example, by color identifiers associated with the color samples. The color identifiers uniquely identify the color represented by the corresponding color sample. According to one aspect of the invention, a color chart can include a gamut identifier that identifies a color gamut relative to the color samples. For example, a gamut identifier can indicate which colors in the chart can be faithfully reproduced by a printing device on a particular medium.

Figure 1:
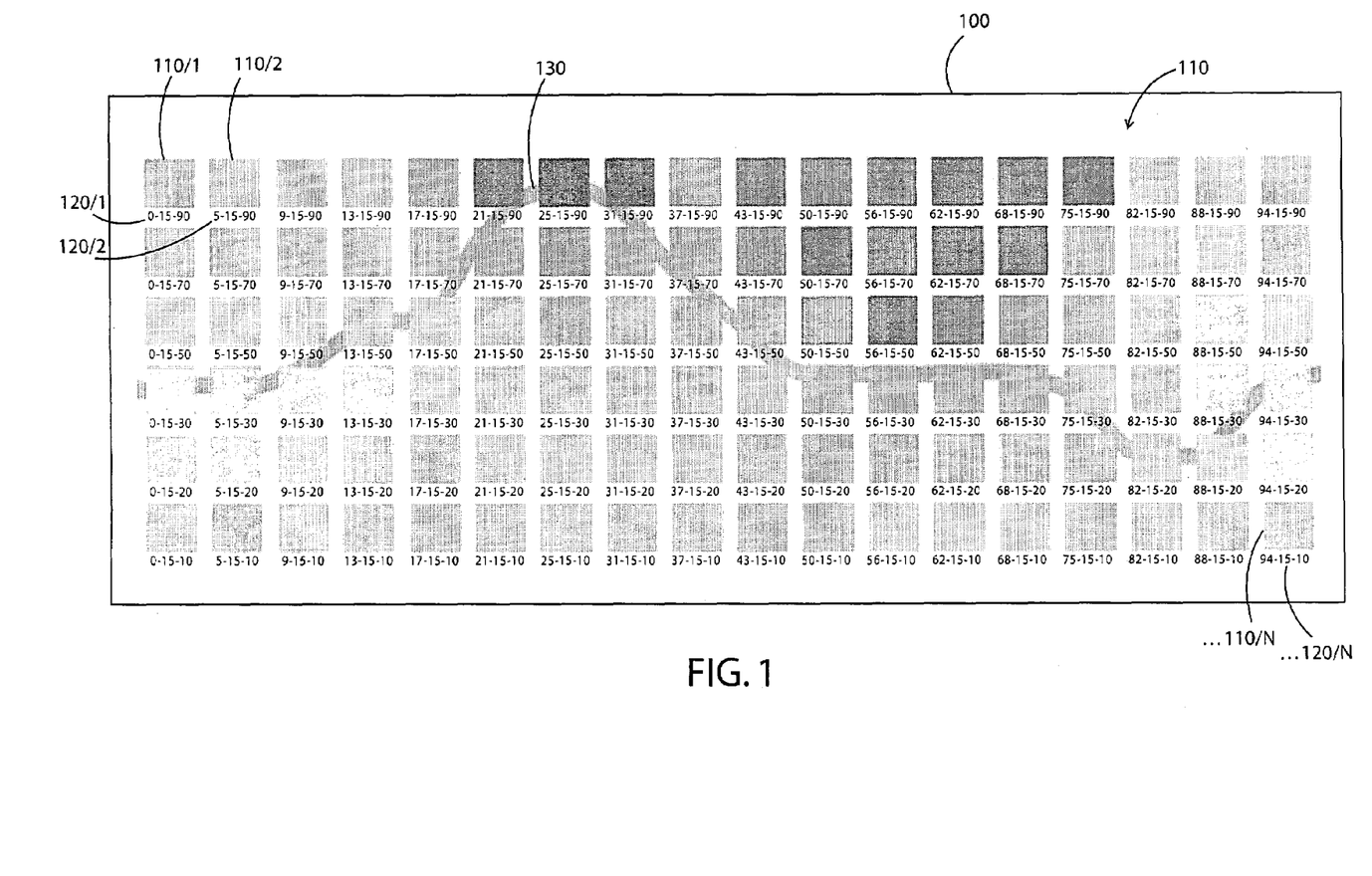
FIG. 1 is a diagram showing a gray level representation of a color chart.

FIG. 1 shows an exemplary color chart 100 according to one implementation of the invention. The color chart 100 includes an arrangement 110 of color samples 110/1-110/N and corresponding color identifiers 120/1-120/N. The color chart 100 also includes a gamut identifier 130 to indicate which color samples in the chart are inside or outside of a color gamut. In FIG. 1, the arrangement 110 is shown as a two-dimensional array. Alternatively, the arrangement can take other configurations, as will be discussed in more detail below.

In the two dimensional array 110, each of the color samples 110/1-110/N includes a rectangular area filled by a single color representing a color from a color space. Color spaces are typically characterized by three or more parameters, which can reflect the percentage of different inks that must be mixed to form a given color (e.g., CMYK), the relative contribution of different phosphors to be used to represent the color on a display screen (e.g., RGB) or other characteristics that relate more closely to the human perception of colors (e.g., L*a*b*). In the example shown in FIG. 1, the color space is characterized by three parameters corresponding to Hue, Darkness, and Saturation of colors ("HDS"). In a colloquial sense, Hue parameter values identify the sample's "color" such as red, green, blue, or violet; Darkness parameter values correspond to a fraction of incident light absorbed by the sample; and Saturation parameter values describe how bright or dull the corresponding colors are. Typically, as the amount of ink increases on a paper, both the Darkness and the Saturation values increase.

The color identifiers 120/1-120/N identify HDS parameter values for each of the color samples 110/1-110/N in the array 110. Each color identifier is associated with a single color sample and includes three numbers corresponding to Hue-Darkness-Saturation parameter values of the color represented by the sample. In the array 110, the color samples 110/1-110/N have a common Darkness value (which is 15), and are arranged in rows and columns. Color samples in each column have a common Hue value, and the Hue value increases uniformly from the left most column towards the right most column in the array. Color samples in each row have a common Saturation value, and the Saturation value increases uniformly from the bottom row towards the top row of the array.

The Hue, Darkness, and Saturation parameter values have a common range that, in this example, is chosen to continuously extend from 0.0 to 100.0, where a Hue value of 0 corresponds to magenta, 10 to red, 25 to yellow, 40 to green, 60 to blue, and 90 to violet; a Darkness value of 0 corresponds to white and 100 to black; and a Saturation value of 0 corresponds to gray and 100 to a strongest color. These HDS values not just identify colors but, in the colloquial sense discussed above, also describe the identified colors in a way that designers can easily relate to these parameters. Furthermore, designers can recall more easily parameter values having a common range. Optionally, the parameter values can have different parameter ranges, or the various values in the parameter ranges can correspond to different color characteristics.

The HDS color space is defined such that each HDS color value, and each corresponding color sample in the color chart 100, is uniquely related to a corresponding L*a*b* color. L*a*b* colors specify colors according to a device independent color standard defined by the Commission International de l'Eclairage ("CIE") and used by the International Color Consortium ("ICC") for color management. L*a*b* colors are scientifically defined based on human perception of colors, and can be measured by a suitable instrument. In one implementation, the Hue ("H"), Darkness ("D"), and Saturation ("S") parameters are related to the three L*a*b* color parameters L, a, and b by the following mathematical formulas:

$L = 100 - D,$ $a = S \cos(2\pi H/100),$ and $b = S \sin(2\pi H/100);$ where cos( ) and sin( ) are the cosine and sine functions, respectively.

The color chart 100 also includes a gamut identifier 130 represented in FIG. 1 as a gray line extending behind the color samples across the chart 100. The gamut identifier 130 can represent a gamut of, e.g., a device printing or displaying colors on a medium, and indicate that color samples below the line can be faithfully reproduced by the device on that medium. Color samples above the line cannot be reproduced on the medium, and are typically adjusted according to a gamut mapping by the device. Gamut mappings are discussed in more detail below with reference to FIG. 3.

In the color chart 100, the gamut identifier 130 is represented by a continuous line and the color samples represent discrete points in the continuous HDS color space. In the array 110, each color sample has a position that corresponds to the Hue and Saturation parameter values of the represented color. For example, as shown in FIG. 1, the center of each color sample is positioned according to the sample's Hue and Saturation value, i.e., the horizontal position corresponds to the Hue value and the vertical position corresponds to the Saturation value of the sample. The gamut identifier 130 identifies the color gamut for the discrete Hue parameter values represented by the samples and also for Hue values in between the discrete values.

By referring to the gamut identifier 130 in the color chart 100, a designer can immediately see which colors are inside or outside of the corresponding gamut. For example, if the gamut identifier corresponds to the gamut of CMYK inks, the designer does not need a cross reference chart to identify which colors can be printed with these inks.

Figure 2:
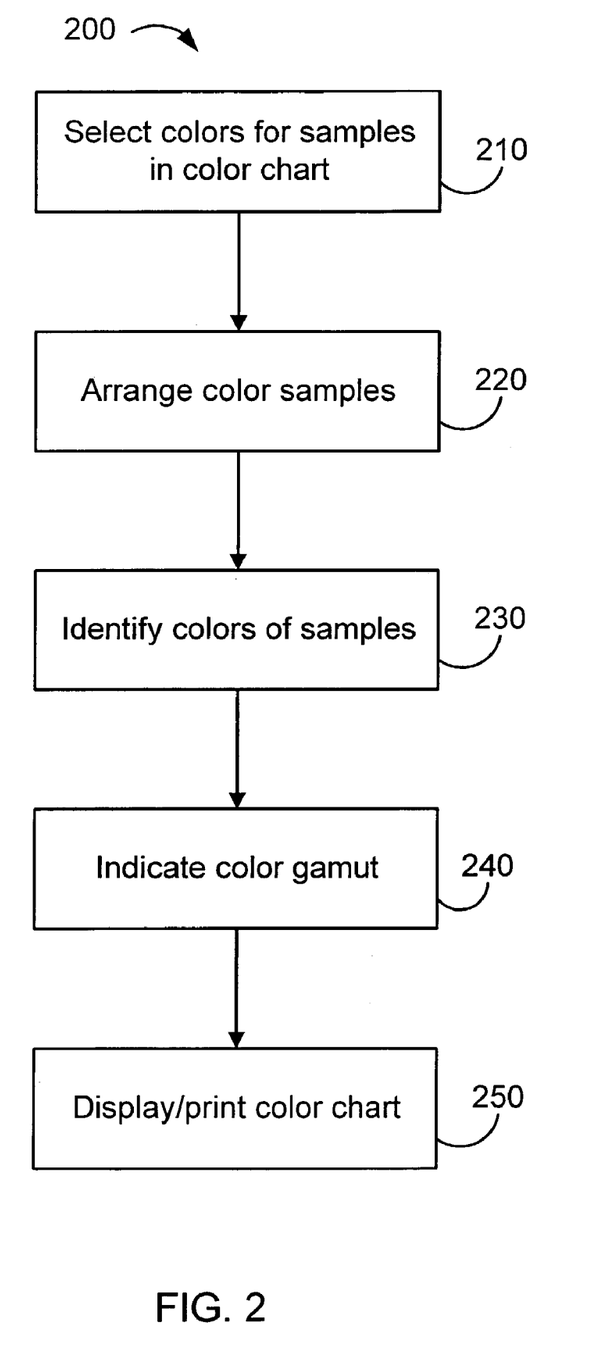
FIG. 2 is a flow diagram showing a method for generating a color chart.

FIG. 2 shows a method 200 for generating a color chart according to one aspect of the invention. Colors are selected for samples to be included in the color chart (step 210). The selection can be based on a user input or can be achieved according to instructions in a computer application. For example a user can specify a number and a parameter range for the color samples. The selected colors can have parameter values evenly distributed in the parameter range. Optionally, the parameter values can be distributed in a non-even fashion. The selected colors can have common parameters, such as the Darkness parameter for the color chart shown in FIG. 1. Optionally, more than one chart can be generated, each of the generated charts including color samples with different values of the common parameter.

The colors can be selected from a color space such as the color space described by HDS parameters. In alternative implementations, the color space can be described by parameters other than HDS parameters. For example, for presenting colors on computer displays, a color chart can use a three-parameter color space with RGB parameters. Alternatively, a color chart can use a four-parameter colors space with CMYK parameters for press publishing, or L*a*b* colors for device calibration.

Color samples in the color chart are arranged (step 220). The shape and arrangement of the samples can be predetermined or based on user input. Preferably, each color sample represents a single color. Each color sample can have a rectangular area filled with a corresponding color, as shown in FIG. 1. In alternative implementations, the samples can have different shapes or sizes. The shape, size, and arrangement of the samples should allow a designer to visually identify the color of the sample and to compare that color to the color of other samples.

The color samples can be arranged in a two dimensional array where each sample has a position that corresponds to parameter values of the represented color in a color space, as shown in FIG. 1. Alternatively, the samples can be arranged in concentric circles or in any other arrangement, where the position of the samples may or may not correspond to parameter values of the represented colors. Color samples can be arranged such that neighboring samples have a common Hue value. Samples with the common hue value can form a sequence sorted according to Saturation values, such as the columns in the array 110 (FIG. 1). Optionally, the Hue values of the sequence can be slightly different than the common Hue value, if differences between Hue values in the sequence are much smaller than differences between the common Hue value and Hue values of samples that are outside of the sequence. For example, Hue values along the sequence can slightly oscillate about the common Hue value. Such arrangement can help a designer to visualize gamut mappings, as discussed below with reference to FIG. 3. In alternative implementations, the color samples can be arranged or sorted based on other criteria, such as Darkness values.

The arranged color samples are uniquely identified (step 230) with color identifiers. In general, the color identifiers can include numbers, axes, arrows, or any other visual signs to uniquely identify parameter values for each color of the samples. A color identifier can be associated with a single sample, as shown in FIG. 1, or with more than one sample. For example, the color chart 100 includes only color samples having a single Darkness value, so a single Darkness identifier could identify the Darkness value for all samples in the array 110. Furthermore, the color identifiers can be provided separate from the color samples, such as on a separate sheet, or can include instructions to identify samples.

A color gamut is indicated in the color chart (step 240), e.g., by using a gamut identifier, such as the gamut identifier 130 shown in FIG. 1. Typically, the color gamut can be described by gamut functions. For example, the gamut function can specify a gamut Saturation value for each of a set of Hue values. For each Hue value, the gamut Saturation value separates colors that are inside the gamut, i.e., have smaller Saturation than the gamut value, from colors that are outside the gamut, i.e., have larger Saturation than the gamut value. Such gamut functions can be represented by a line that connects gamut Saturation values of sample sequences with common Hue and sorted Saturation values.

In alternative implementations, the gamut identifier can include any visual signs that indicate which color samples are inside or outside of the color gamut. For example, the gamut identifier can be a set of tags associated only with samples representing reproducible colors. In one implementation, the gamut identifier can be a straight line, or any other predetermined line. In this implementation, the color samples are arranged relative to the predetermined gamut identifier.

The identified color gamut can be a color gamut of a device or a medium, or any other color gamut, e.g., a color gamut of a set of inks. Optionally, a single color chart can include more than one gamut identifier. For example, each identifier can correspond to a color gamut of a different device or a different media. A color chart indicating multiple gamuts can facilitate cross-media publication.

The color chart is printed or displayed (step 250). If displayed or printed with a device whose color gamut includes all color samples in the chart, the color chart can be used as a device independent chart. Alternatively, if printed or displayed with a device whose color gamut does not include all color samples in the chart, but does include all color samples within the color gamut indicated in the chart, the chart can be used as a device dependent chart.

Figure 3:
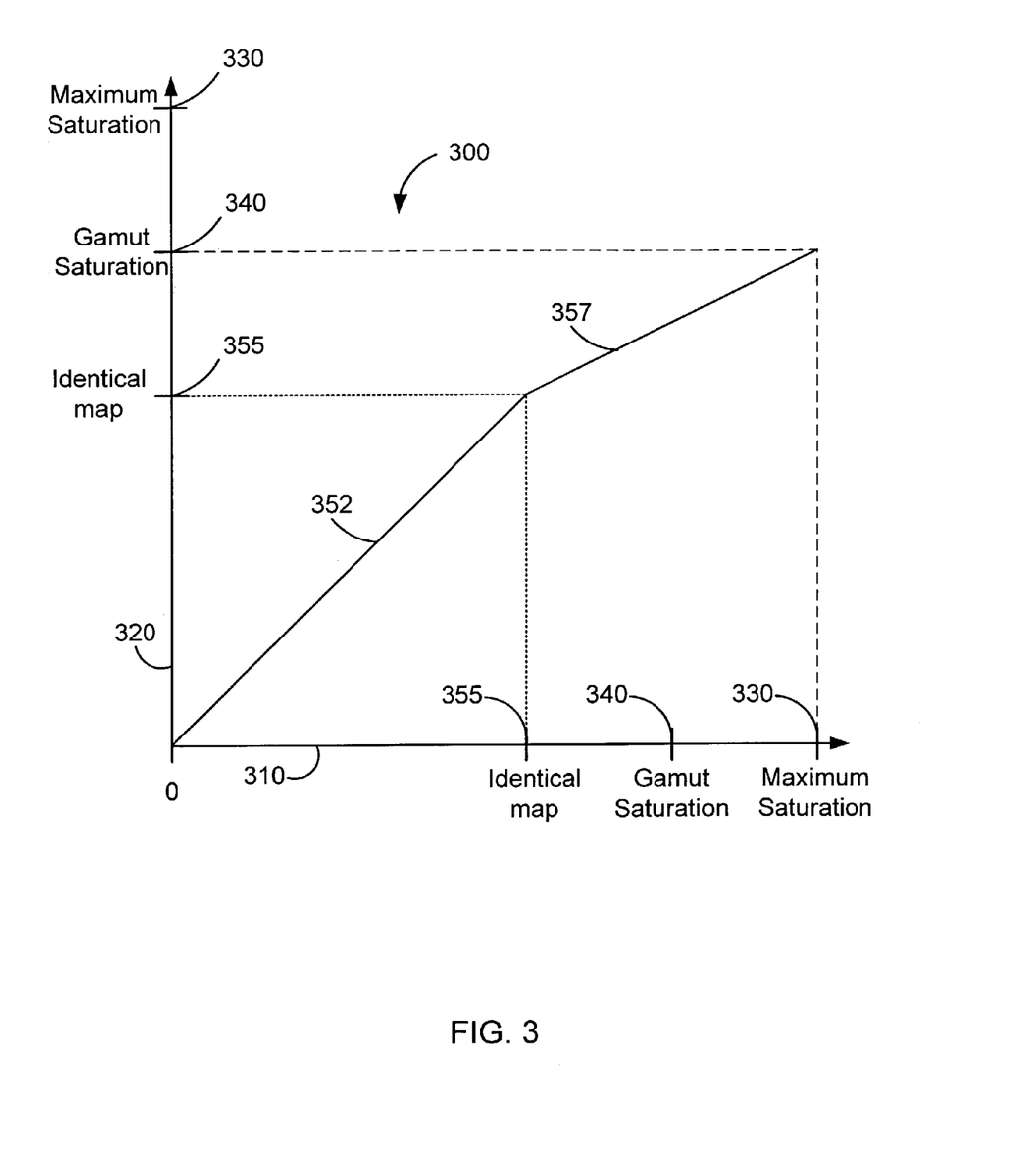
FIG. 3 is a diagram showing a gamut mapping.

FIG. 3 shows an exemplary gamut mapping 300 for HDS colors. The gamut mapping 300 does not change Hue and Darkness values, but can reduce Saturation values of colors. Accordingly, the mapping 300 corresponds to a particular Hue value and a particular Darkness value. By keeping the Hue value unchanged, the mapping 300 does not affect the "color" in the colloquial sense, i.e., yellow remains yellow and blue remains blue. Optionally, gamut mappings can change Darkness values. Mappings that change Darkness can be advantageous when the Darkness value of a color is very small or very high. For example, on certain media, there is a maximum darkness that can be faithfully reproduced, and a gamut mapping can reduce Darkness values above the maximum darkness.

The gamut mapping 300 maps Saturation values represented on a horizontal axis 310 into mapped Saturation values represented on a vertical axis 320. On the horizontal axis, the Saturation values have a maximum saturation value 330 that represents a highest saturation of colors. The mapping 300 maps the maximum saturation value 330 to a gamut saturation value 340 that represents the outer boundary of a color gamut. The gamut saturation value is an upper limit for the mapped Saturation values on the vertical axis. By adopting this limit, the mapping 300 insures that all mapped colors are inside the color gamut indicated by the gamut saturation value 340 for the particular Hue and Darkness values.

The gamut mapping 300 includes a first 352 portion and a second portion 357. According to the first portion 352, saturation values below an identical map value 355 are mapped identically, i.e., these saturation values do not change due to the mapping 300. According to the second portion 357, saturation values between the identical map value 355 and the maximum saturation value 330 are linearly mapped onto mapped saturation values between the identical map value 355 and the gamut saturation value 340.

In alternative implementations, the gamut mapping can use a single continuously increasing portion instead of the first and second portions. For example, a single non-linear portion can map the entire range of saturation values into mapped saturation values below the gamut saturation value 340.

The gamut mapping 300 can be visually estimated by a designer using a gamut identifier on a color chart, such as the gray line 130 shown in FIG. 1. Due to the mapping 300, a color sample above the gray line will be displayed or printed by the device as a color in the same column but slightly below the gray line. This visual estimate is a result of the arrangement used in the array 110 where each column includes color samples of the same Hue value, and Saturation values are sorted to decrease in the column from the top to the bottom.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

By way of example, a printing device implementing an interpreter for a page description language, such as the PostScript® language, includes a microprocessor for executing program instructions (including font instructions) stored on a printer random access memory (RAM) and a printer read-only memory (ROM) and controlling a printer marking engine. The RAM is optionally supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium.

The invention has been described in terms of particular embodiments. Other embodiments are within the scope of the following claims. For example, the steps of the invention can be performed in a different order and still achieve desirable results.

What is claimed is:

1. A system comprising:
a processor; and
a machine-readable storage device including instructions operable to cause the processor to provide a color chart for presenting color samples, the color chart comprising:
an arrangement of a plurality of color samples, each color sample representing a distinct color and having a colored area filled with a corresponding color in a color space;
one or more color identifiers associated with each color sample in the arrangement, the one or more color identifiers associated with each color sample having one or more values uniquely identifying the color represented by the corresponding color sample; and
a gamut identifier identifying a color gamut relative to the colors represented by the color samples in the arrangement where the identified color gamut defines a range of colors and respective color samples that cannot be reproduced by a first device and where the gamut identifier identifies a plurality of colors, represented by two or more color samples of the plurality of color samples in the arrangement, that are outside the identified color gamut.

2. The system of claim 1, wherein:
the arrangement is ordered according to one or more parameters of the color space.

3. The system of claim 1, wherein:
the gamut identifier identifies a color gamut of a printing device on a medium.

4. The system of claim 1, wherein:
the one or more color identifiers include hue values for the colors represented by the associated color samples.

5. The system of claim 4, wherein:
the one or more color identifiers include saturation values for the colors represented by the associated color samples.

6. The system of claim 5, wherein:
the one or more color identifiers include darkness values for the colors represented by the associated color samples.

7. The system of claim 6, wherein:
the hue, saturation and darkness values are each defined in the continuous range from 0 to 100.

8. The system of claim 1, wherein:
the gamut identifier includes a line representing saturation values as a function of hue values.

9. The system of claim 1, wherein:
each color sample occupies a location in the arrangement adjacent to one or more color samples representing colors having hue values substantially equal to the hue value of the color represented by the color sample.

10. The system of claim 9, wherein:
adjacent color samples representing colors that have substantially equal hue values form a sequence along which saturation values of represented colors vary monotonically from sample to sample.

11. The system of claim 1, wherein:
the color space is related to a device-independent color space.

12. The system of claim 11, wherein:
the device-independent color space is L*a*b* color space.

13. The system of claim 1, wherein:
the arrangement defines a two-dimensional array of color samples representing colors sharing a common darkness value.

14. The system of claim 13, wherein:
the array is a rectangular array.

15. The system of claim 13, wherein:
the arrangement includes a plurality of two-dimensional arrays, each array including only color samples representing colors sharing a darkness value that is different from the darkness value of colors represented by the color samples in every other array in the arrangement.

16. The system of claim 1, further comprising:
one or more additional gamut identifiers, each additional gamut identifier identifying a corresponding color gamut relative to the colors represented by the color samples in the arrangement.

17. The system of claim 1, further comprising:
a second gamut identifier identifying a color gamut relative to the colors represented by the color samples in the arrangement, where the second identified color gamut defines a range of colors and respective color samples that cannot be reproduced by a second device.

18. A computer-implemented method for representing colors in a color space, the method comprising:
arranging a plurality of color samples in a color chart, each color sample representing a distinct color and having a colored area filled with a corresponding color in the color space;
displaying one or more color identifiers with each color sample in the color chart, the one or more color identifiers associated with each color sample having one or more values uniquely identifying the color represented by the corresponding color sample; and
displaying, using a display device, a gamut identifier representing a color gamut relative to the colors represented by the color samples arranged in the color chart where the color gamut defines a range of colors and respective color samples that cannot be reproduced by a first device and where the gamut identifier identifies a plurality of colors, represented by two or more color samples of the plurality of color samples in the arrangement, that are outside the identified color gamut.

19. The method of claim 18, wherein:
displaying the gamut identifier includes representing a color gamut of a printing device on a medium.

20. The method of claim 18, further comprising:
mapping a first color from outside the color gamut to a second color inside the color gamut.

21. The method of claim 20, wherein:
mapping a first color includes mapping the first color that has a first saturation value to a second color that has a second saturation value that is smaller than the first saturation value.

22. The method of claim 20, wherein:
mapping a first color includes mapping the first color that has first a darkness value to a second color that has a second darkness value that is smaller than the first darkness value.

23. The method of claim 20, wherein:
mapping the first color includes mapping the first color to the second color such that a hue value of the first color is substantially equal to a hue value of the second color.

24. The method of claim 20, wherein:
mapping the first color includes mapping the first color to the second color such that a darkness value of the first color is substantially equal to a darkness value of the second color.

25. The method of claim 20, further comprising:
defining an outer region of the color gamut; and
wherein the second color is inside the outer region of the color gamut.

26. The method of claim 18, further comprising:
representing one or more additional color gamuts relative to the colors represented by the color samples arranged in the color chart.

27. The method of claim 18, further comprising:
using the color chart to:
identify a first color to be reproduced using the first device, where the first color is outside the range of colors that may be reproduced by the first device, and
compare the selected first color to a second color represented by a particular color sample within the range of colors that are reproducible by the first device; and
replacing the first color with the second color for reproduction using the first device.

28. The method of claim 18, further comprising:
replacing the gamut identifier with a second gamut identifier, the second gamut identifier identifying a color gamut relative to the colors represented by the color samples in the arrangement, where the second identified color gamut defines a range of colors and respective color samples that cannot be reproduced by a second device.

29. A machine-readable storage device tangibly embodying a computer program for representing colors in a color space, the computer program including instructions operable to cause a data processing apparatus to:
arrange a plurality of color samples in a color chart, each color sample representing a distinct color and having a colored area filled with a corresponding color in the color space;
display one or more color identifiers with each color sample in the color chart, the one or more color identifiers associated with each color sample having one or more values uniquely identifying the color represented by the corresponding color sample; and
display a gamut identifier representing a color gamut relative to the colors represented by the color samples arranged in the color chart where the color gamut defines a range of colors and respective color samples that cannot be reproduced by a first device and where the gamut identifier identifies a plurality of colors, represented by two or more color samples of the plurality of color samples in the arrangement, that are outside the identified color gamut.

30. The machine-readable storage device of claim 29, wherein the computer program including instructions operable to cause data processing apparatus to display the gamut identifier further includes instructions operable to cause data processing apparatus to:
represent a color gamut of a printing device on a medium.

31. The machine-readable storage device of claim 29, where the computer program further comprises instructions operable to cause data processing apparatus to:
map a first color from outside the color gamut to a second color inside the color gamut.

32. The machine-readable storage device of claim 31, wherein the computer program including instructions operable to cause data processing apparatus to map a first color further includes instructions operable to cause data processing apparatus to:
map the first color that has a first saturation value to a second color that has a second saturation value that is smaller than the first saturation value.

33. The machine-readable storage device of claim 31, wherein the computer program including instructions operable to cause data processing apparatus to map a first color further includes instructions operable to cause data processing apparatus to:
map the first color that has first a darkness value to a second color that has a second darkness value that is smaller than the first darkness value.

34. The machine-readable storage device of claim 31, wherein the computer program including instructions operable to cause data processing apparatus to map a first color further includes instructions operable to cause data processing apparatus to:
map the first color to the second color such that a hue value of the first color is substantially equal to a hue value of the second color.

35. The machine-readable storage device of claim 31, wherein the computer program including instructions operable to cause data processing apparatus to map a first color further includes instructions operable to cause data processing apparatus to:
map the first color to the second color such that a darkness value of the first color is substantially equal to a darkness value of the second color.

36. The machine-readable storage device of claim 31, where the computer program further comprises instructions operable to cause data processing apparatus to:
define an outer region of the color gamut; and
wherein instructions operable to cause data processing apparatus to map a first color include instructions operable to cause data processing apparatus to map a first color to a second color inside the outer region of the color gamut.

37. The machine-readable storage device of claim 29, where the computer program further comprises instructions operable to:
represent one or more additional color gamuts relative to the colors represented by the color samples arranged in the color chart.

38. A system comprising:
means for arranging a plurality of color samples in a color chart, each color sample representing a distinct color and having a colored area filled with a corresponding color in the color space;
means for displaying one or more color identifiers with each color sample in the color chart, the one or more color identifiers associated with each color sample having one or more values uniquely identifying the color represented by the corresponding color sample; and
means for displaying a gamut identifier representing a color gamut relative to the colors represented by the color samples arranged in the color chart where the color gamut defines a range of colors and respective color samples that cannot be reproduced by a first device and where the gamut identifier identifies a plurality of colors, represented by two or more color samples of the plurality of color samples in the arrangement, that are outside the identified color gamut.

39. The system of claim 38, wherein:
displaying the gamut identifier includes representing a color gamut of a printing device on a medium.

40. The system of claim 38, further comprising:
means for mapping a first color from outside the color gamut to a second color inside the color gamut.

41. The system of claim 40, wherein:
mapping a first color includes mapping the first color that has a first saturation value to a second color that has a second saturation value that is smaller than the first saturation value.

42. The system of claim 40 wherein:
mapping a first color includes mapping the first color that has first a darkness value to a second color that has a second darkness value that is smaller than the first darkness value.

43. The system of claim 40, wherein:
mapping the first color includes mapping the first color to the second color such that a hue value of the first color is substantially equal to a hue value of the second color.

44. The system of claim 40, wherein:
mapping the first color includes mapping the first color to the second color such that a darkness value of the first color is substantially equal to a darkness value of the second color.

45. The system of claim 40, further comprising:
means for defining an outer region of the color gamut; and
wherein the second color is inside the outer region of the color gamut.

46. The system of claim 38, further comprising:
means for representing one or more additional color gamuts relative to the colors represented by the color samples arranged in the color chart.

47. The system of claim 38, further comprising:
means for replacing the gamut identifier with a second gamut identifier, the second gamut identifier identifying a color gamut relative to the colors represented by the color samples in the arrangement, where the second identified color gamut defines a range of colors and respective color samples that cannot be reproduced by a second device.

* * * * *